(12) United States Patent
Kwon et al.

(10) Patent No.: US 7,308,846 B2
(45) Date of Patent: Dec. 18, 2007

(54) APPARATUS FOR CUTTING LIQUID CRYSTAL DISPLAY PANEL

(75) Inventors: Yung-Chul Kwon, Gyeongsangbook-Do (KR); Jung-Sik Kim, Chungcheongnam-Do (KR); Jong-Yull Park, Gyeongsangbook-Do (KR); Kyu-Jae Jeon, Gyeongsangbook-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 185 days.

(21) Appl. No.: 10/832,312

(22) Filed: Apr. 27, 2004

(65) Prior Publication Data

US 2004/0217142 A1  Nov. 4, 2004

(30) Foreign Application Priority Data

Apr. 29, 2003 (KR) .................. 10-2003-0027124

(51) Int. Cl.
*B26D 3/08* (2006.01)
*C03B 33/027* (2006.01)

(52) U.S. Cl. .......................................... 83/886; 83/676
(58) Field of Classification Search ................ 83/886, 83/887, 879, 880, 875, 651, 676, 663; 225/2, 225/96; 30/164.95, 347, 319, 357; 125/37
See application file for complete search history.

(56) References Cited

U.S. PATENT DOCUMENTS 5,836,229 A * 11/1998 Wakayama et al. .......... 83/886
6,478,206 B2 * 11/2002 Shimotoyodome et al. .... 225/2
6,796,212 B2 *  9/2004 Maekawa et al. ............. 83/886

FOREIGN PATENT DOCUMENTS

| CN | 200410037583.1 | | 12/2004 |
|---|---|---|---|
| JP | U5988428 | * | 6/1984 |
| JP | 04-4028 | | 1/1992 |
| JP | 5-254865 | | 10/1993 |
| JP | 9-188534 | | 4/1997 |
| JP | 2001058841 | * | 3/2001 |
| JP | 2002047022 | * | 2/2002 |
| JP | 20020234748 | * | 8/2002 |
| JP | 2004-223799 | | 8/2004 |
| KR | 10-279184 B1 | | 10/2000 |
| KR | 2000-71315 | | 11/2000 |
| KR | 2002-8435 | | 1/2002 |
| SU | 1629259 | * | 2/1991 |
| WO | WO-2004082906 | * | 9/2004 |
| WO | WO-2004083140 | * | 9/2004 |

* cited by examiner

*Primary Examiner*—Stephen Choi
(74) *Attorney, Agent, or Firm*—McKenna Long & Aldridge LLP

(57) ABSTRACT

An apparatus for cutting a liquid crystal display panel includes a cutting wheel having a spindle shape substantially corresponding to two conical shapes being attached to each other at circular bottom surfaces, a cutting blade along a central portion of the cutting wheel, a holder to which the cutting wheel is mounted, and a support part at the holder, the support part fixing and supporting the cutting wheel.

18 Claims, 7 Drawing Sheets

APPARATUS FOR CUTTING LIQUID CRYSTAL DISPLAY PANEL

The present application claims the benefit of Korean Patent Application No. 10-2003-0027124 filed in Korea on Apr. 29, 2003, which is hereby incorporated by reference.

BACKGROUND OF THE INVENTION

1. Field of the Invention

The present invention relates to an apparatus for cutting a substrate, and more particularly, to an apparatus for cutting a liquid crystal display panel fabricated on a large-sized mother substrate into individual liquid crystal display panel units.

2. Discussion of the Related Art

In general, a liquid crystal display device is a display device where data signals corresponding to picture information are individually supplied to liquid crystal cells arranged in a matrix form in the display device. Light transmittance of the liquid crystal cells is controlled based on the data signals to display a desired picture.

The liquid crystal display apparatus generally is fabricated by forming thin film transistor array substrates on a large-sized mother substrate, forming color filter substrates on a separate mother substrate and bonding the two mother substrates to each other, thereby simultaneously fabricating multiple individual liquid crystal display panel units and thereby improving fabrication yield. Such a fabrication requires a process for cutting the large-sized mother substrates to form individual liquid crystal display panel units.

The cutting process for the liquid crystal display panels is generally carried out by forming a groove on the surface of the mother substrate using a wheel and applying a force on the mother substrate to form a crack (split) along the groove, thereby cutting the mother substrate into multiple liquid crystal display panel units.

FIG. 1 is a view of a cutting wheel for a liquid crystal display panel of the related art. In FIG. 1, a cutting wheel 10 includes a circular body 11, a cutting blade 12 protruded along an edge of the circular body 11, a hole 13 provided at a central portion of the circular body 11, and a support spindle 14 placed through the hole 13. The cutting blade 12 of the cutting wheel 10 is closely attached on a substrate 15 with certain pressure and rotates in a state of being supported by the support spindle 14 to form a groove having a certain depth on a surface of the substrate 15. After the groove is formed on the substrate 15, a force is applied downwardly on the surface of the substrate 15 to form a crack (split) along the groove, thereby cutting the substrate 15.

FIG. 2 is a view of the cutting wheel of FIG. 1 coupled to a holder 16. In FIG. 2, the holder 16 includes a first opening at a bottom surface and a second opening at a vertical surface, such that the cutting wheel 10 is placed in the holder 16 from the first opening and the support spindle 14 is placed in the holder 16 and through the hole 13 of the cutting wheel 10 from the second opening. The holder 16 also includes a cover 17 for closing the second opening.

FIGS. 3 and 4 are cross-sectional views of the cutting wheel of FIG. 1. In FIG. 3, the cutting wheel 10 has a width of about 0.64 mm and upper and lower isolation intervals between the cutting wheel 10 and the support spindle 14 are respectively set to be about 5 μm. When the cutting wheel 10 is used to form a groove of a certain depth on a surface of a substrate, the cutting wheel 10 can be shaken laterally due to a tolerance (generally, 10-25 μm) in inserting the support spindle 14 into the cutting wheel 10. For example, if the cutting wheel 10 is shaken, an actual isolation interval between the cutting wheel 10 and the support spindle 14 becomes about 10 μm, and the cutting wheel 10 is shaken at an angle θ1 of 0.89°, thereby distorting the rotation of the cutting wheel 10.

In FIG. 4, as the cutting wheel 10 is shaken, friction occurs at the hole 13 between the circular body 11 and the support spindle 14, thereby grinding the central portion of the cutting wheel 10 around the hole 13. In particular, since the cutting wheel 10 is shaken at an angle, the abrasion of this central portion becomes more severe toward its outer edges. Subsequently, an angle θ1 of FIG. 3 becomes larger as the cutting wheel 10 is being used.

In addition, when the cutting wheel 10 is used to form a groove on a surface of the substrate 15, the cutting blade 12 is also abraded due to friction between the cutting blade 12 and the substrate 15 caused by the shaking of the cutting wheel 10. Subsequently, the cutting blade 12 may not maintain being perpendicular to the substrate 15, and a groove is formed irregularly on the surface of the substrate 15.

Further, because the support spindle 14 typically has a material harder than the substrate 15, a degree of abrasion due to friction between the cutting wheel 10 and the support spindle 14 is greater than a degree of abrasion due to friction between the cutting blade 12 and the substrate 15. Accordingly the degree of abrasion due to the friction between the cutting wheel 10 and the support spindle 14 determines a life span of the cutting wheel 10. Thus, the cutting wheel 10 has to be changed even though the cutting blade 12 is not severely abraded and is still usable. Accordingly, an operation of such a cutting equipment is frequently stopped, thereby reducing productivity and increasing cost.

SUMMARY OF THE INVENTION

Accordingly, the present invention is directed to an apparatus that substantially obviates one or more of the problems due to limitations and disadvantages of the related art.

An object of the present invention is to provide an apparatus for cutting a liquid crystal display panel capable of preventing a body of a cutting wheel from being abraded due to friction between the body of the cutting wheel and a support spindle through a hole provided at a central portion of the cutting wheel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the apparatus for cutting a liquid crystal display panel includes a cutting wheel having a spindle shape substantially corresponding to two conical shapes being attached to each other at circular bottom surfaces, a cutting blade along a central portion of the cutting wheel, a holder to which the cutting wheel is mounted, and a support part at the holder, the support part fixing and supporting the cutting wheel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
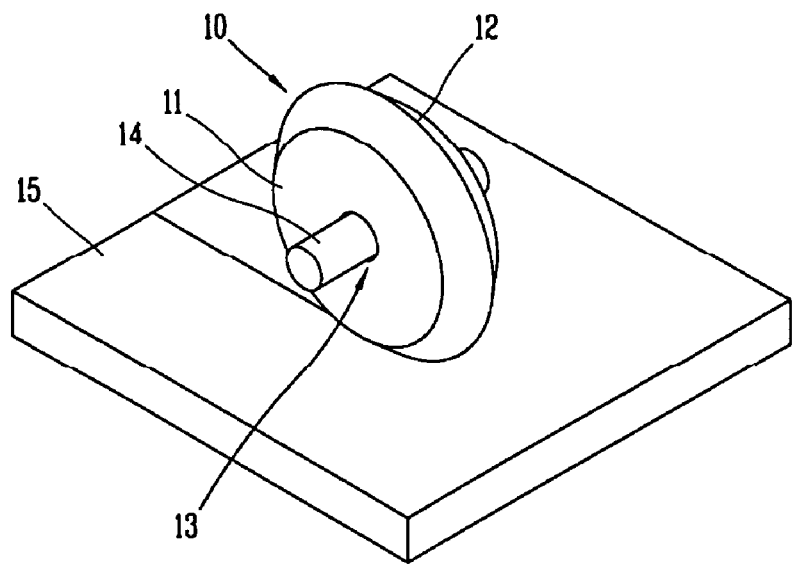
FIG. 1 is a view of a cutting wheel for a liquid crystal display panel of the related art.
Figure 2:
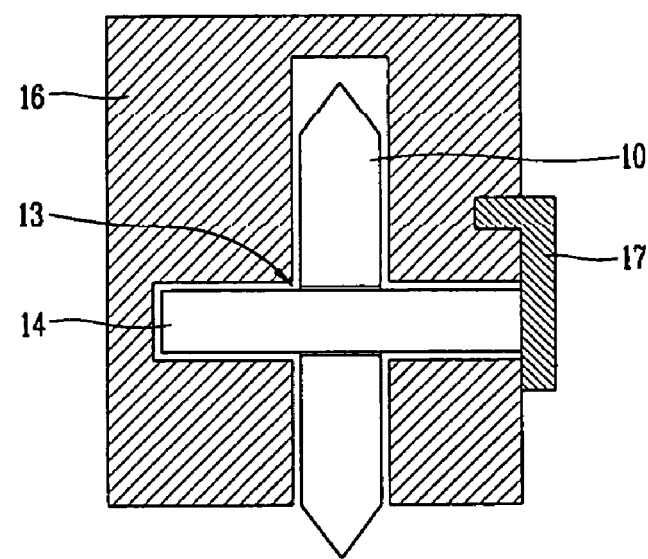
FIG. 2 is a cross-sectional view of the cutting wheel of FIG. 1 coupled to a holder.
Figure 3:
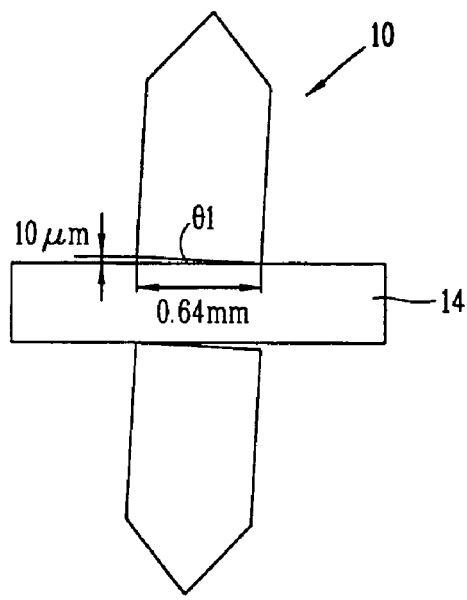
FIGS. 3 and 4 are cross-sectional views of the cutting wheel of FIG. 1.
Figure 4:
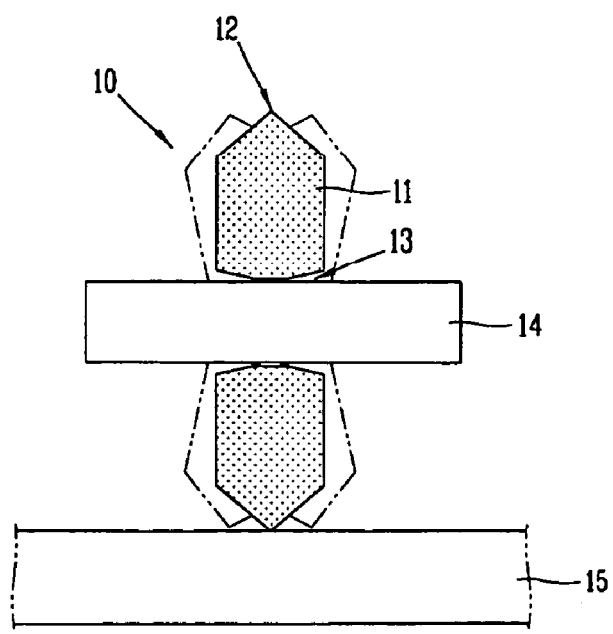
Figure 5:
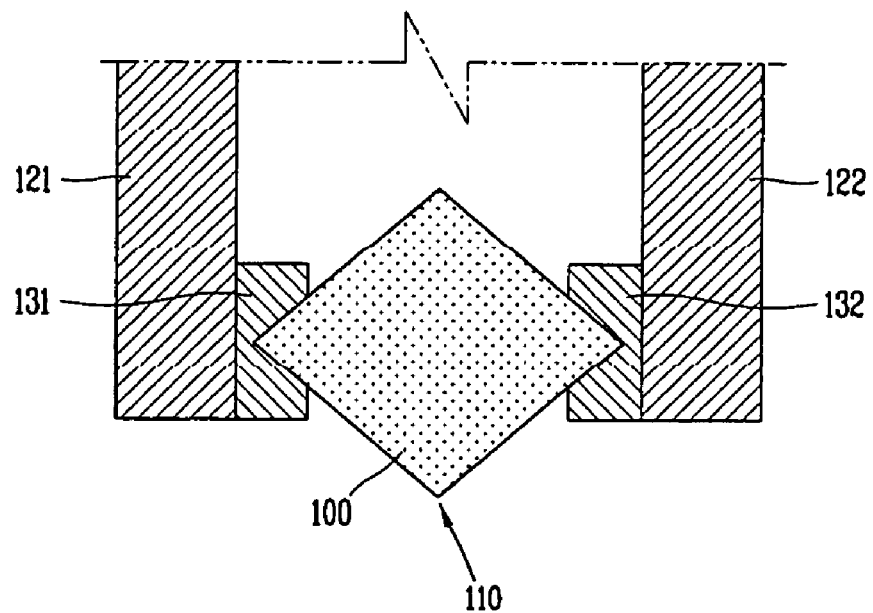
FIG. 5 is a view of an exemplary apparatus for cutting a liquid crystal display panel in accordance with an embodiment.

FIG. 5 is a view of an exemplary apparatus for cutting a liquid crystal display panel in accordance with an embodiment. In FIG. 5, a cutting wheel 100 may be formed in a spindle shape and may include a cutting blade 110 provided along a central portion of the cutting wheel 100. The cutting wheel 100 may be held by a pair of holders 121 and 122. In particular, the holders 121 and 122 may be adjustable such that they can be moved closer to each other to mount the cutting wheel 100 therebetween or they can be moved further apart from each other to detach the cutting wheel 100 therefrom. In addition, support parts 131 and 132 may be provided at the pair of holders 121 and 122 contacting a part of the cutting wheel 100 to fix and to support the cutting wheel 100 thorough a surface contact. Accordingly, as the cutting wheel 100 is fixed and supported by the support parts 131 and 132, so that it may be closely attached to a substrate with a certain pressure and is rotated, a groove having a certain depth may be formed on a surface of the substrate. After the groove is formed on the substrate in such a manner, an external downward force may be applied on the substrate to create a crack (split) along the groove, thereby cutting the substrate.

The cutting wheel 100 and the support parts 131 and 132 may be formed of a material including tungsten (W), hard-metal cemented carbide, such as tungsten carbide (WC) or titanium carbide (TiC), or polycrystalline diamond (PCD) having a high hardness. In addition, the cutting wheel 100 and the support parts 131 and 132 may be formed of the same material or materials having substantially the same hardness to minimize abrasion due to friction between the cutting wheel 100 and the support parts 131 and 132 and to minimize the shaking of the cutting wheel 100. Further, when the cutting blade 110 of the cutting wheel 100 is abraded due to the friction with the substrate, the cutting wheel 100 may be easily detached from the holders 121 and 122 by adjusting a distance between the holders 121 and 122. Once the cutting wheel 100 is detached, the cutting blade 110 may be ground and sharpened. Then, the cutting wheel 100 may be easily mounted on the holders 121 and 122 for further re-used, thereby increasing the usage length of the cutting wheel 100 and decreasing fabrication cost.

Figure 6:
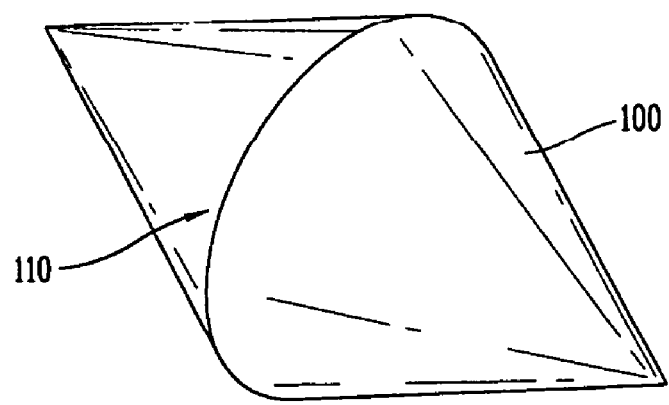
FIG. 6 is a view of the cutting wheel of FIG. 5.

FIG. 6 is a view of the cutting wheel of FIG. 5. In FIG. 6, the cutting wheel 100 may be in a form similar to two conical shapes being attached to each other at their circular bottom surfaces. In addition, the cutting blade 110 may be provided along a circumference of such a connection between the bottom surfaces of the two conical shapes.

Figure 7:
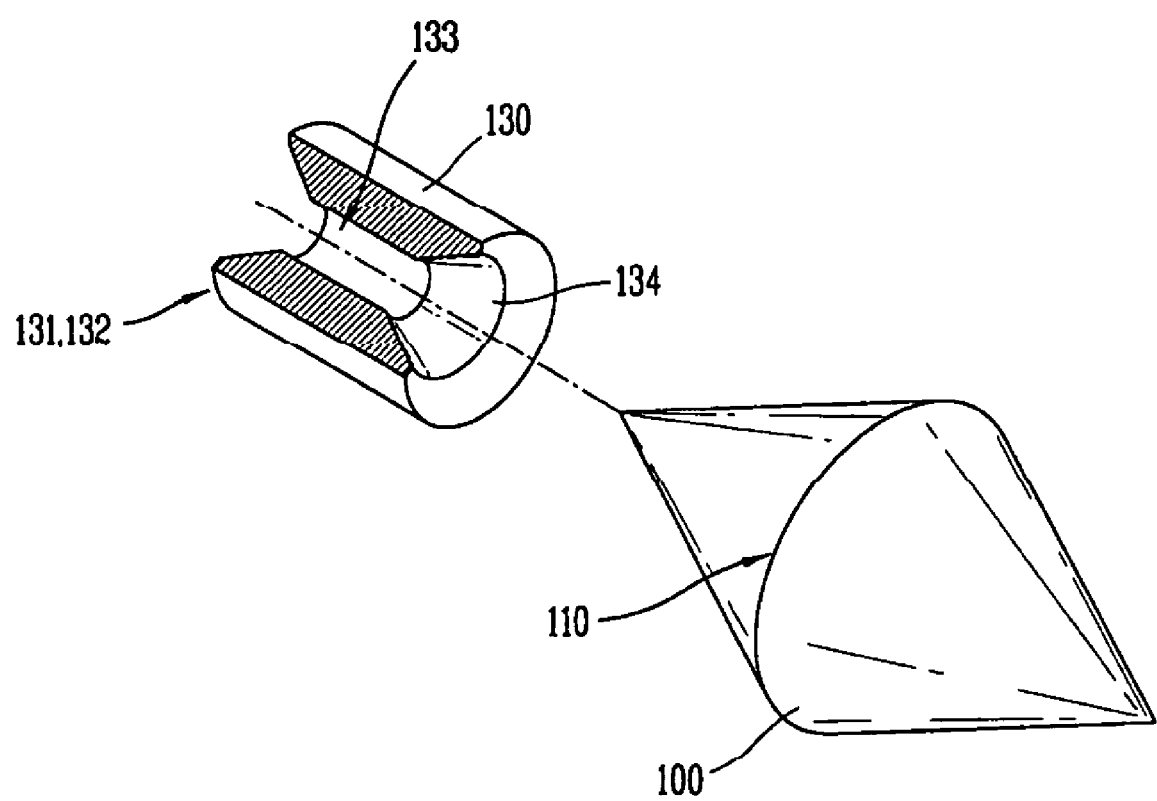
FIG. 7 is a view of the cutting wheel and the support part of FIG. 5.

FIG. 7 is a view of the cutting wheel and the support part of FIG. 5. In FIG. 7, each of the support parts 131 and 132 may have a body 130. The body 130 maybe in a cylindrical shape with a through hole 133 at a central portion of the body 130. In addition, the through hole 133 may be in a circular shape. Further, a diameter of a portion of the through hole 133 may be increased gradually as the through hole 133 extends toward an opening of the body 130 to matching an end portion shape of the cutting wheel 100. Thus, when the support part 131 or 132 receives the cutting wheel 100, a surface of the end portion of the cutting wheel contacts an inclined surface 134 of the through hole 133, thereby forming a more secure mounting.

Figure 8A:
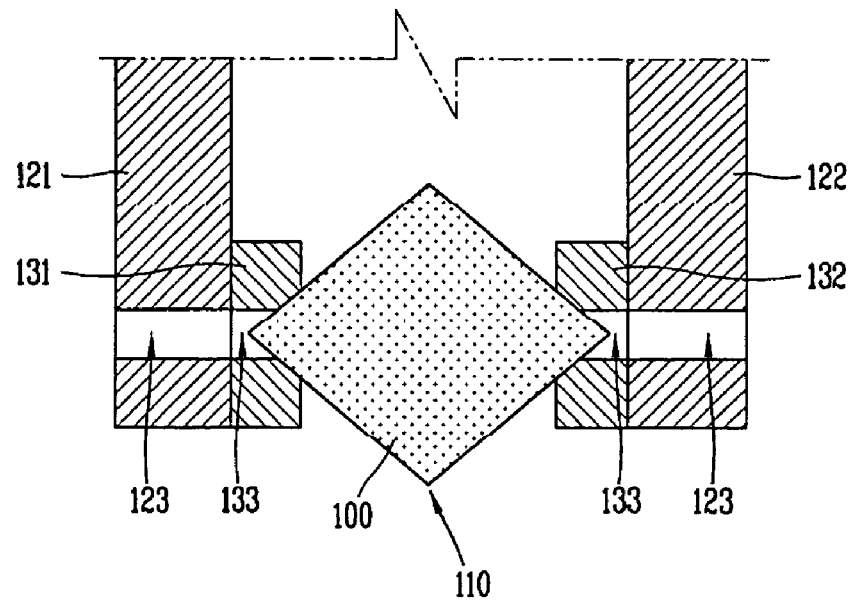
FIGS. 8A to 8C are cross-sectional views of various combinations of the holder and the support part of FIG. 5.
Figure 8B:
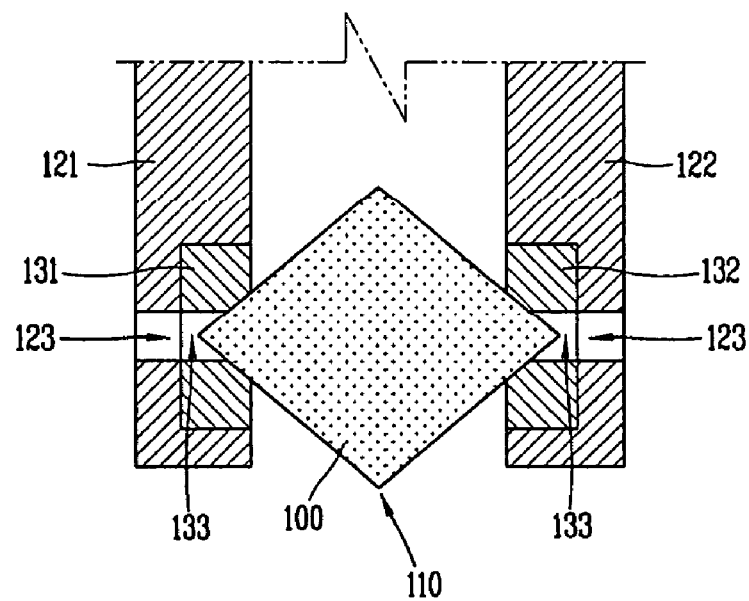
Figure 8C:
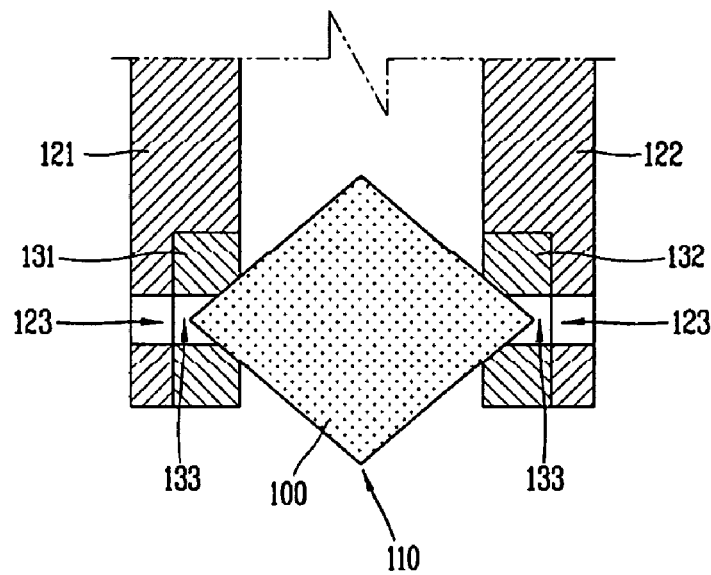

FIGS. 8A to 8C are cross-sectional views of various combinations of the holder and the support part of FIG. 5. In FIG. 8A, the support parts 131 and 132 may be formed on surfaces of the holders 121 and 122 such that they protrude from surfaces of the holders 121 and 122. In addition, each of the holders 121 and 122 may include a second through hole 123 corresponding to the through hole 133 of the support part 131 or 132.

In FIG. 8B, the support parts 131 and 132 may be formed in grooves of the holders 121 and 122. In particular, the support parts 131 and 132 may be embedded in the holders 121 and 122 and surfaces of the holders 121 and 122 and the support parts 131 and 132 may be flush. In addition, each of the holders 121 and 122 may include a second through hole 123 corresponding to the through hole 133 of the support part 131 or 132.

In FIG. 8C, the support parts 131 and 132 may be formed at end portions of the holders 121 and 122. In particular, each of the holders 121 and 122 may have a step shape at its end portion for receiving the support parts 131 and 132, such that surfaces of the holders 121 and 122 and the support parts 131 and 132 may be flush. Each of the holders 121 and 122 may also include a second through hole 123 corresponding to the through hole of the support part 131 and 132.

Figure 9:
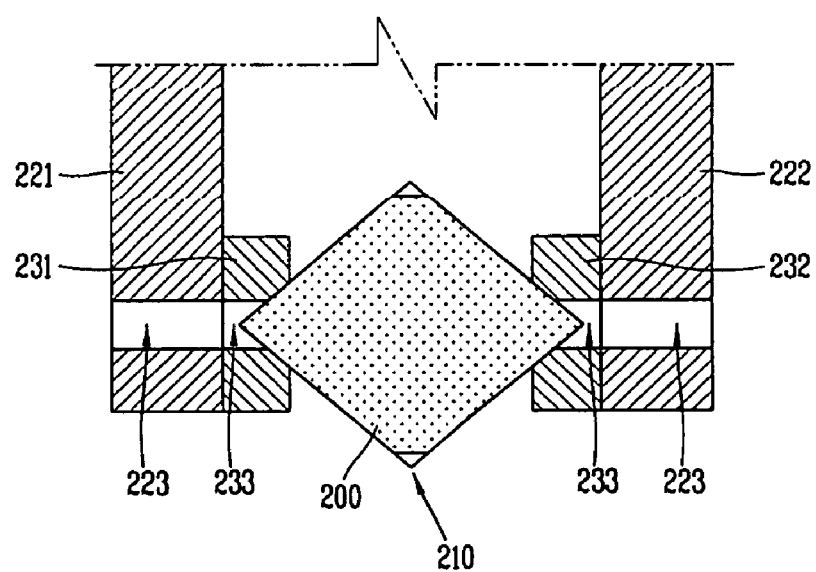
FIG. 9 is a view of an exemplary apparatus for cutting a liquid crystal display panel in accordance with another embodiment.

FIG. 9 is a view of an exemplary apparatus for cutting a liquid crystal display panel in accordance with another embodiment. In FIG. 9, a cutting wheel 200 may be formed in a spindle shape. The cutting wheel 200 may be formed in a shape similar to two conical shapes being attached to each other at their bottom circular surfaces. The cutting wheel 200 may include a cutting blade 210 provided along a circumference of a central portion of the cutting wheel 200. In particular, the cutting blade 210 may have a concave-convex structure at regular intervals along the circumference of the central portion of the cutting wheel 200. The cutting wheel 200 may be held by a pair of holders 221 and 222. The cutting holders 221 and 222 may be adjustable such that they can be moved closer to each other to mount the cutting wheel 200 therebetween or they can be moved further apart from each other to detach the cutting wheel 200 therefrom. In addition, support parts 231 and 232 may be provided at the pair of holders 221 and 222 contacting a part of the cutting wheel 200 to fix and to support the cutting wheel 200 through a surface contact. Accordingly, as the cutting wheel 200 is fixed and supported by the support parts 231 and 232, so that it may be closely attached to a substrate with a certain pressure and is rotated, a groove having a certain depth may be formed on a surface of the substrate. After the groove is formed on the substrate in such a manner, an external downward force may be applied on the substrate to create a crack (split) along the groove, thereby cutting the substrate.

The cutting wheel 200 and the support parts 231 and 232 may be formed of a material including tungsten (W), hard-metal cemented carbide, such as tungsten carbide (WC) or titanium carbide (TiC), or polycrystalline diamond (PCD) having a high hardness. In addition, the cutting wheel 200 and the support parts 231 and 232 may be formed of the same material or materials having substantially the same hardness to minimize abrasion due to friction between the cutting wheel 200 and the support parts 231 and 232 and to minimize the shaking of the cutting wheel 200.

In addition, the concave-convex structure of the cutting blade 210 represses a slip of the cutting blade 210 on the substrate, thereby avoiding forming an abnormal groove on the surface of the substrate. Further, since the concave-convex structure of the cutting blade 210 provides a better contact between the cutting blade 210 and the substrate, cutting of the substrate is more easily carried out. Moreover, even if attachment pressure between the cutting blade 210 and the substrate is lowered, cutting the substrate is possible. Therefore, the slip of the cutting blade 210 may be repressed, and other portions of the substrate except a contact portion between the cutting blade 210 and the substrate may be prevented from being damaged by the cutting blade 210.

Figure 10:
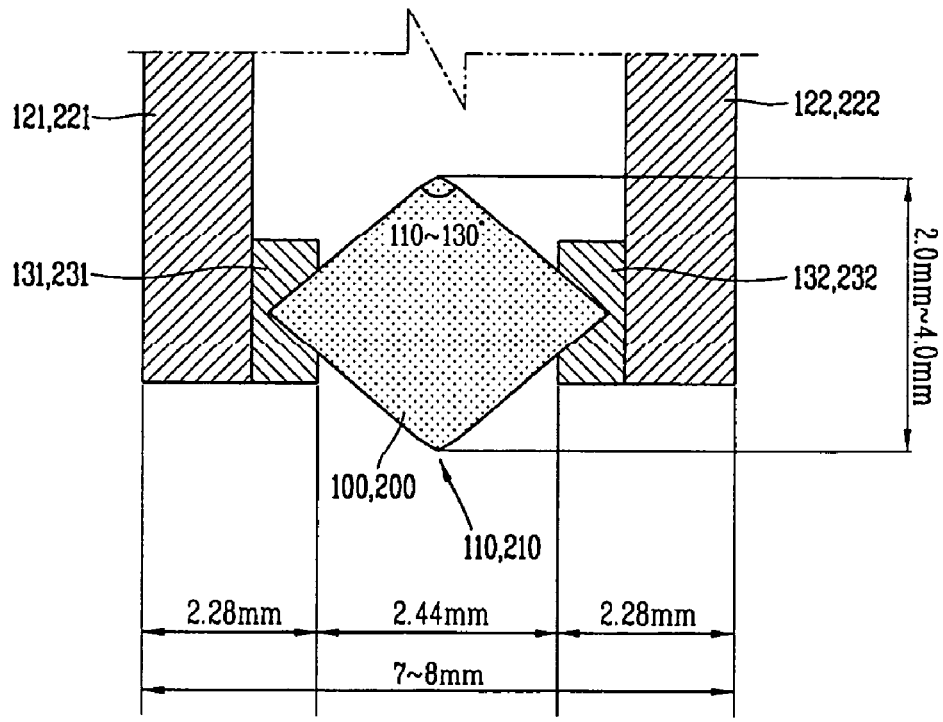
FIG. 10 is a view showing each component for an apparatus for cutting a liquid crystal display panel in accordance with the embodiments.

FIG. 10 is a view showing each component for an apparatus for cutting a liquid crystal display panel in accordance with the embodiments. In FIG. 10, a diameter of a central portion of a spindle-shaped cutting wheel 100 and 200 may be about 2.0~4.0 mm, and a central portion of the cutting wheel 100 and 200 may be ground to have an angle of about 110~130° relative to a longitudinal axis. In addition, a pair of holders 121, 122, 221 and 222 and support parts 131, 132, 231 and 232 to which the spindle-shaped cutting wheel 100 and 200 is mounted, fixed and supported may have a width of about 2.28 mm. A gap between the pair of holders 121, 122, 221 and 222 and the support parts 131, 132, 231 and 232, to which the spindle-shaped cutting wheel 100 and 200 is mounted may be about 2.44 mm. The overall width of the structure that the spindle-shaped cutting wheel 100 and 200 is mounted between the pair of the holders 121, 122, 221 and 222 and the support parts 131, 132, 231 and 232 may be about 7~8 mm.

Figure 11:
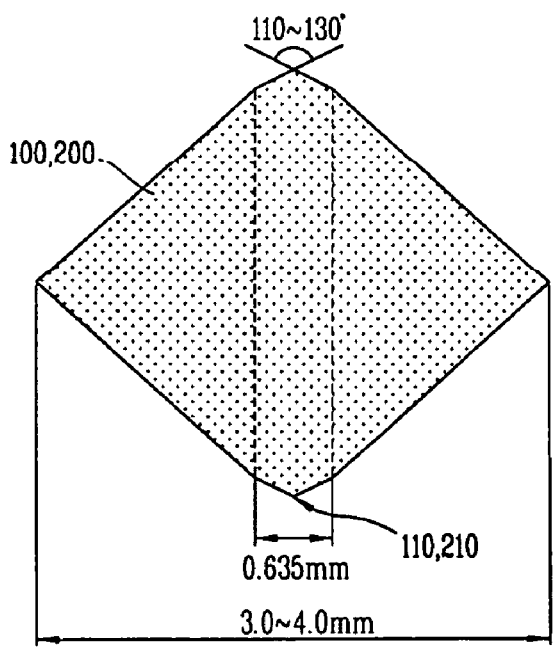
FIG. 11 is a detailed view of the cutting wheel of FIG. 10.

FIG. 11 is a detailed view of the cutting wheel of FIG. 10. In FIG. 11, a distance between apexes of conical shapes of the cutting wheel 100 and 200 may be about 3.0~4.0 mm. A cutting blade 110 and 210 provided along a circumference of the central portion of the cutting wheel 100 and 200 may be ground to have an angle of about 110~130° relative to a longitudinal axis and may be have a ground angle larger than that of the cutting wheel 100 and 200. In addition, the cutting blade 110 and 210 fabricated to have a ground angle larger than that of the cutting wheel 100 and 200 may have a width of about 0.635 mm.

As so far described, an apparatus for cutting a liquid crystal display panel in accordance with the embodiments may repress abrasion of a cutting wheel since the spindle-shaped cutting wheel and the support parts formed of a material having a high hardness are rotated in surface-contact with each other. Further, even if abrasion of the cutting wheel occurs, a shaking of the cutting wheel may be minimized. Accordingly, since the cutting blade of the cutting wheel may maintain being perpendicular to a substrate for a long time, a life span of the cutting wheel may be lengthened and thus a period of change of a cutting wheel may be lengthened too. Thus, an operation rate of equipment is increased, its productivity is improved, and fabrication cost corresponding to purchase cost for a cutting wheel may be reduced.

In addition, if the cutting blade of the cutting wheel is abraded due to friction with a substrate, the cutting wheel is detached easily from the holders. Then, the cutting blade is ground and the cutting wheel is mounted to the holders again for further use. Thus, a life span of the cutting wheel is further lengthened.

It will be apparent to those skilled in the art that various modifications and variations can be made in the apparatus for cutting liquid crystal display panel without departing from the spirit or scope of the invention. Thus, it is intended that the present invention covers the modifications and variations of this invention provided they come within the scope of the appended claims and their equivalents.

What is claimed is:

1. An apparatus for cutting a liquid crystal display panel, comprising:
   a cutting wheel having a spindle shape substantially corresponding to two conical shapes attached to each other at a common circular bottom surface of the conical shapes;
   a cutting blade along a central portion of the cutting wheel;
   a holder to which the cutting wheel is mounted to rotate along an axis having a first direction; and
   a support part that projects from the holder along the first direction having a body and a through hole at a central portion of the body at the holder, the support part fixing and supporting the cutting wheel,
   wherein the support part includes an inclined surface matching an end of the spindle shape of the cutting wheel, and
   wherein a portion of the through hole includes a portion of the inclined surface as the through hole extends toward an opening of the body and the inclined surface of the support part is in surface-contact with a part of the cutting wheel.

2. The apparatus of claim 1, wherein the cutting wheel and the cutting blade are integrally formed as a single body.

3. The apparatus of claim 1, wherein the cutting wheel and the support part are formed of a same material or materials having substantially the same hardness.

4. The apparatus of claim 1, wherein the cutting wheel and the support part are formed of one of tungsten (W), hard-metal cemented carbide and polycrystalline diamond (PCD).

5. The apparatus of claim 1, wherein the holder includes a pair of holding parts and the holding parts are adjustable to change a distance therebetween.

6. The apparatus of claim 1, wherein the body is cylindrical.

7. The apparatus of claim 6, wherein the support part is formed on a side surface of the holder and is protruded from the side surface.

8. The apparatus of claim 7, wherein the holder includes a second through hole corresponding to the through hole of the support part.

9. The apparatus of claim 6, wherein the support part is coupled to a groove provided at one side surface of the holder.

10. The apparatus of claim 9, wherein the holder includes a second through hole corresponding to the through hole of the support part.

11. The apparatus of claim 1, wherein the cutting blade has a concave-convex structure.

12. The apparatus of claim 1, wherein a diameter of the central portion of the cutting wheel is about 2.0~4.0 mm.

13. The apparatus of claim 1, wherein a distance between apexes of conical shapes of the cutting wheel is about 3.0~4.0 mm.

14. The apparatus of claim 1, wherein a ground angle of the cutting wheel is about 110~130° relative to a longitudinal axis.

15. The apparatus of claim 1, wherein the overall width of the structure that the cutting wheel is mounted between the holder and the support part is about 7~8 mm.

16. The apparatus of claim 1, wherein the cutting blade has a ground angle larger than that of the cutting wheel.

17. The apparatus of claim 16, wherein the ground angle of the cutting blade is about 110~130° relative to a longitudinal axis.

18. The apparatus of claim 1, wherein the inclined surface of the support part matches a shape of an end portion of the cutting wheel.

* * * * *

UNITED STATES PATENT AND TRADEMARK OFFICE
CERTIFICATE OF CORRECTION

| | | |
|---|---|---|
| PATENT NO. | : 7,308,846 B2 | Page 1 of 1 |
| APPLICATION NO. | : 10/832312 | |
| DATED | : December 18, 2007 | |
| INVENTOR(S) | : Yung-Chul Kwon | |

It is certified that error appears in the above-identified patent and that said Letters Patent is hereby corrected as shown below:

Please correct item no. 73 on the Title Page of the patent. The assignees should be:

LG Display Co., Ltd.
Top Engineering Co., Ltd.

Signed and Sealed this
Fifth Day of June, 2012

David J. Kappos
*Director of the United States Patent and Trademark Office*